United States Patent
Wang et al.

(10) Patent No.: US 10,575,120 B2
(45) Date of Patent: Feb. 25, 2020

(54) METHOD OF AUTONOMOUS SOCIAL MEDIA SYSTEM

(71) Applicants: Ray Wang, McLean, VA (US); Chih Wang, McLean, VA (US)

(72) Inventors: Ray Wang, McLean, VA (US); Chih Wang, McLean, VA (US)

(*) Notice: Subject to any disclaimer, the term of this patent is extended or adjusted under 35 U.S.C. 154(b) by 872 days.

(21) Appl. No.: 15/055,545

(22) Filed: Feb. 27, 2016

(65) Prior Publication Data
US 2017/0251049 A1 Aug. 31, 2017

(51) Int. Cl.
| H04W 4/02 | (2018.01) |
| H04L 29/08 | (2006.01) |
| G06Q 50/00 | (2012.01) |
| G06Q 10/10 | (2012.01) |
| H04L 12/58 | (2006.01) |

(52) U.S. Cl.
CPC .............. *H04W 4/02* (2013.01); *G06Q 10/10* (2013.01); *G06Q 50/01* (2013.01); *H04L 67/10* (2013.01); *H04L 51/32* (2013.01); *H04W 4/025* (2013.01)

(58) Field of Classification Search
CPC .......... H04L 51/32; H04W 4/02; H04W 4/025
See application file for complete search history.

(56) References Cited

U.S. PATENT DOCUMENTS

| 7,240,325 | B2 | 7/2007 | Keller |
| 7,359,724 | B2 * | 4/2008 | Torvinen .............. H04W 4/021 455/456.2 |
| 7,586,888 | B2 | 9/2009 | Wang |
| 7,630,736 | B2 | 12/2009 | Wang |
| 7,788,485 | B2 | 8/2010 | Connell |
| 7,801,058 | B2 | 9/2010 | Wang |
| 7,937,484 | B2 | 5/2011 | Julia et al. |
| 8,010,601 | B2 * | 8/2011 | Jennings ................. H04W 4/02 709/203 |
| 8,195,744 | B2 | 6/2012 | Julia et al. |
| 8,195,765 | B2 | 6/2012 | Julia et al. |
| 8,224,308 | B1 | 7/2012 | Gavrylyako |
| 8,260,689 | B2 | 9/2012 | Dollens |
| 8,305,935 | B2 | 11/2012 | Wang |
| 8,305,936 | B2 | 11/2012 | Wang |
| 8,353,052 | B2 | 1/2013 | Larsson et al. |
| 8,411,590 | B2 | 4/2013 | Wang |
| 8,427,979 | B1 | 4/2013 | Wang |
| 8,463,765 | B2 | 6/2013 | Lesavich |
| 8,554,369 | B2 | 10/2013 | Dollens |
| 8,738,693 | B2 | 5/2014 | Julia et al. |
| 8,738,730 | B2 | 5/2014 | Julia et al. |
| 8,787,164 | B2 | 7/2014 | Julia et al. |
| 8,819,140 | B2 | 8/2014 | Julia et al. |
| 8,965,460 | B1 | 2/2015 | Rao et al. |
| 8,971,850 | B2 | 3/2015 | Klein |
| 8,973,072 | B2 | 3/2015 | Julia et al. |
| 9,037,564 | B2 | 5/2015 | Lesavich et al. |

(Continued)

*Primary Examiner* — Aaron N Strange
(74) *Attorney, Agent, or Firm* — Lesavich High-Tech Law Group, S.C.

(57) ABSTRACT

Method for location-centric social network and provide means for users to interact with each other over the Internet more private and effective through location correlated information content, and, more particularly, to a method and system for autonomous social media system that based upon location-reference rather than on user-centered process.

16 Claims, 15 Drawing Sheets

(56) References Cited

U.S. PATENT DOCUMENTS

| | | |
|---|---|---|
| 9,037,654 B2 | 5/2015 | Lesavich et al. |
| 9,137,250 B2 | 9/2015 | Lesavich et al. |
| 9,292,885 B2 | 3/2016 | Astore |
| 9,292,886 B2 | 3/2016 | Astore |
| 9,348,916 B2 | 5/2016 | Astore |
| 9,361,479 B2 | 6/2016 | Lesavich et al. |
| 9,390,384 B2 | 7/2016 | Wang et al. |
| 9,569,771 B2 | 2/2017 | Lesavich et al. |
| 9,667,948 B2 | 5/2017 | Wang et al. |
| 9,705,736 B2 | 7/2017 | Wang et al. |
| 2003/0236821 A1 | 12/2003 | Jiau |
| 2004/0157649 A1 | 8/2004 | Jannard et al. |
| 2006/0026271 A1 | 2/2006 | Julia et al. |
| 2006/0047843 A1 | 3/2006 | Julia et al. |
| 2006/0123053 A1 | 6/2006 | Scannell |
| 2006/0167985 A1 | 7/2006 | Albanese et al. |
| 2006/0182076 A1 | 8/2006 | Wang |
| 2007/0090996 A1 | 4/2007 | Wang |
| 2007/0286378 A1 | 12/2007 | Brown et al. |
| 2008/0025330 A1 | 1/2008 | Wang |
| 2008/0059188 A1 | 3/2008 | Konopka et al. |
| 2008/0123683 A1 | 5/2008 | Cheng et al. |
| 2008/0300917 A1 | 12/2008 | Ryan et al. |
| 2009/0070884 A1 | 3/2009 | Wu et al. |
| 2009/0189739 A1 | 7/2009 | Wang |
| 2009/0215469 A1* | 8/2009 | Fisher ............... H04L 51/32 455/456.3 |
| 2005/0333958 | 2/2010 | Connell |
| 2010/0324956 A1 | 12/2010 | Lopez et al. |
| 2011/0019587 A1 | 1/2011 | Wang |
| 2011/0149802 A1 | 6/2011 | Fok Ah Chuen et al. |
| 2011/0208710 A1 | 8/2011 | Lesavich |
| 2011/0210816 A1 | 9/2011 | Wang |
| 2011/0235627 A1 | 9/2011 | Wang |
| 2011/0302620 A1 | 12/2011 | Karaoguz et al. |
| 2012/0136623 A1 | 5/2012 | Edge |
| 2012/0278622 A1 | 11/2012 | Lesavich et al. |
| 2013/0094538 A1 | 4/2013 | Wang |
| 2014/0006377 A1 | 1/2014 | Astore |
| 2014/0095607 A1* | 4/2014 | Fraccaroli ............... H04W 4/21 709/204 |
| 2014/0189792 A1 | 7/2014 | Lesavich et al. |
| 2014/0344420 A1 | 11/2014 | Rjeili |
| 2015/0066624 A1 | 3/2015 | Astore |
| 2015/0066673 A1 | 3/2015 | Astore |
| 2015/0066689 A1 | 3/2015 | Astore |
| 2015/0066692 A1 | 3/2015 | Astore |
| 2015/0116465 A1 | 4/2015 | Wang et al. |
| 2015/0263886 A1 | 9/2015 | Wang et al. |
| 2015/0379301 A1 | 12/2015 | Lesavich et al. |
| 2016/0248825 A1* | 8/2016 | Li ............... H04L 67/18 |
| 2016/0321654 A1 | 11/2016 | Lesavich et al. |
| 2016/0330773 A1* | 11/2016 | Aneja ............... H04W 76/10 |
| 2017/0034113 A1* | 2/2017 | Rao ............... H04L 51/20 |
| 2017/0063754 A1* | 3/2017 | Kirschbaum ........... H04L 51/10 |
| 2017/0091854 A1 | 3/2017 | Wang et al. |

* cited by examiner

FIGURE 13

| H | Web server IP address | SID address | UID address | Recipient's ID or E-mail address | User data: E-mail, picture, video, message |

METHOD OF AUTONOMOUS SOCIAL MEDIA SYSTEM

FIELD OF THE INVENTION

The present invention relates to social network and provide means for users to interact with each other over the Internet more private and effective through location correlation, and, more particularly, to a method and system for autonomous social media.

BACKGROUND OF THE INVENTION

Today, social media platforms are user-centered services in which users require to register with personal information, such as age, name, gender, cell phone number. The fact that social media sites generate revenue from targeted advertising which is based on massive collection on personal information and profiling. As such, social media have been collecting users' data, either registered or not, without their consent. For example, the French data protection authority on, Feb. 8, 2016, gave Facebook three months to stop tracking non-users' web activity without their consent and ordered the social network to stop some transfers of personal data to the United States.

Recent research reveals that identity theft affects millions of people a year, costing victims countless hours and money in identity recovery and repair. One of the reasons causes this pattern of online theft and fraud is a lack of consumer knowledge regarding protecting own identity online. More alarming is that consumers are growing comfort, and trust in, with the mainstream social media platform providers, such as Facebook, Google+, Twitter, etc., In addition, a lack of ethics or policing of the personal data gathering by the social media makes the privacy protection even more difficult. This issue will become consciousness sooner rather than later.

The main issue with the mainstream social media is that users are exposed to identity theft and fraud with limited government oversight, industry standards or incentives to educate users on security, privacy and identity protection. Additionally, social media platforms have already collected massive confidential user information, and are likely vulnerable to outside (or inside) attack. On the marketing front, social media have been tracking registered users' locations from their cell phones through the global positioning system (GPS) or via communication network references such as a cell tower location ID or Internet IP address.

One concern associated with personal information gathering is that all the social media sites employ centralized database system for storing users' accounts containing personal information. The centralized database system is vulnerable to cyber attack.

Another concern is that once the personal contact information is on public domain it opens up for many unwanted contacts from unfamiliar third party.

With the increased global use of social media, there are more opportunities than ever before to steal identities or perpetrate fraud online.

Thus, it would be advantageous for the new method to provide the same social media convention, such as sharing photos, music, text, videos, blogs, and applications, yet requires no collection on personal private information.

It would be further advantageous for the new method to provide an effective information delivery within a community where the information matters them most.

It would also be advantageous for the new method to deliver self-governing information to locations with which the information content is associated.

SUMMARY OF THE INVENTION

In accordance with the present invention, there is provided method for Autonomous Social Media System to deliver social media content, such as sharing photos, music, text, videos, blogs, and applications, based on location-correlation rather than on user-centered process.

BRIEF DESCRIPTION OF THE DRAWINGS

A complete understanding of the present invention may be obtained by reference to the accompanying drawings, when considered in conjunction with the subsequent, detailed description, in which:

FIG. 13 is an example of transport protocol data unit when conducting social media convention over autonomous social media system;

The foregoing and other features and advantages of preferred embodiments of the present invention will be more readily apparent from the following detailed description. The detailed description proceeds with references to the accompanying drawings.

DESCRIPTION OF THE PREFERRED EMBODIMENT

Figure 1:
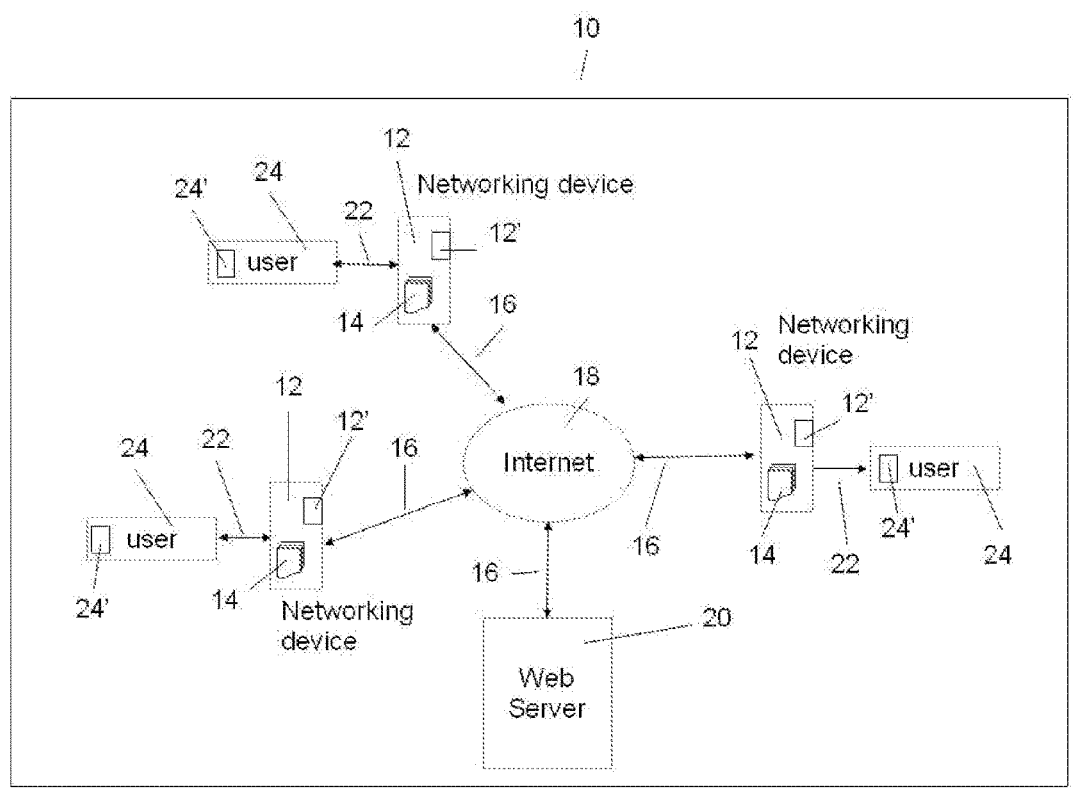
FIG. 1 is a top view of a representation of autonomous social media system.

FIG. 1 is a top view of an autonomous social media system 10 for managing and distributing location correlated content. It includes nine main elements: networking device 12, system identifier (SID) 12', location correlated content 14, network access 16, Internet 18, web server 20, user access 22, user 24, and user identifier (UID) 24'. Only three networking device 12, 12', four network access 16, one Internet 18, one web server 20, three user access 22, and three user 24, 24' are shown. The provided method does not limit the quantity of each element.

Networking device 12 is a distributed computing and communication device. Every networking device 12 deployed within autonomous social media system 10 is assigned with SID 12' and Internet Protocol (IP) address; both are administrated by web server 20.

Networking device 12 manages and distributes location correlated content 14. Location correlated content 14 is locally significant information; the information relates to the location where a networking device 12 is located. The locally significant information is autonomous because it delivers to user 24 who is near the networking device 12 automatically without user's specifically login and search for.

Networking device 12 can either be as a stationary or non-stationary. Both stationary and non-stationary networking device(s) 12 utilize SID 12' to shield user's privacy. Therefore, SID 12' serves as a location correlation between user 24 and networking device 12. As such, user's communication is recognized by location correlation rather than user's name and password.

Depending on user's location when in motion, user 24 may correlate with one or more networking device 12.

SID 12' is a location code correlates with networking device 12 within autonomous social media system 10. The code comprises numerical strings such as, but is not limited to, Internet Protocol (IP) address, Global Positioning System (GPS), Zone Improvement Plan (ZIP) code, and extended ZIP+4 code used by United States Postal Service (USPS).

IP address is a numerical label assigned to each computing device participating in a computer network that uses the Internet Protocol for communication. The designers of the Internet Protocol defined an IP address as a 32-bit number and this system, known as Internet Protocol Version 4 (IPv4), is still in use today. However, because of the growth of the Internet and the predicted depletion of available addresses, a new version of IP (IPv6), using 128 bits for the address, was developed in 1995 IPv6 was standardized as RFC 2460 in 1998 and its deployment has been ongoing since the mid-2000s. IP addresses are usually written and displayed in human-readable notations, such as 172.16.254.1 (IPv4), and 2001:db8:0:1234:0:567:8:1 (IPv6).

GPS is a space-based navigation system that provides location and time information in all weather conditions, anywhere on or near the Earth where there is an unobstructed line of sight to four or more GPS satellites. The system provides critical capabilities to military, civil, and commercial users around the world. The United States government created the system, maintains it, and makes it freely accessible to anyone with a GPS receiver.

ZIP codes are a system of postal codes used by the United States Postal Service (USPS) since 1963. The term ZIP, an acronym for Zone Improvement Plan, was chosen to suggest that the mail travels more efficiently, and therefore more quickly (zipping along), when senders use the code in the postal address. ZIP+4 code, introduced in 1983, includes the five digits of the ZIP code, a hyphen, and four additional digits that determine a more specific location within a given ZIP code.

Location correlated content 14 is location significant information, which includes, but is not limited to, news, weather forecast, emergency alerts, sports, even schedule, direction, lost and found, telephone directory, etc., 14 can be delivered over voice, data, or video format.

Location correlated content 14 relates to people who are near or interested in specific location. For example, weather forecast for Washington D.C. is a location content that interests most to the DC area residents and to people visiting and/or traveling to DC area. One benefit for receiving location correlated content 14 is improved communication efficiency around that specific location.

Another benefit for deploying location correlated content 14 is that it creates marketing opportunity to target people who are physically near a particular networking device 12. For example, a user 24 waiting at airport gate could receive travel related product advertisement in addition to airplane arriving/departure schedule and other travel related messages.

In one embodiment of the invention, the networking device 12 collects and distributes information that is related locally. However, the present invention is not limited to this embodiment and the networking device 12 can also distribute other non-local significant contents such as a picture, a video, a message, a blog, and/or combination thereof.

A networking device 12 serves two functions: 1) interacting with user 24 over user access 22 for distributing location correlated content 14; and 2) interfacing and communicating with web server 20 on Internet 18 over network access 16 to obtain updated content 14.

Networking device 12 is a combination of hardware and software and includes, but is not limited to: one or many communication media, data storage device, central processing unit, random-access memory, display, and computer software module utilizing software programming, web-based markup languages, and communication protocol stack.

A networking device 12 is regularly communicating with the user 24 over user access 22 to deliver location correlated content 14.

A networking device 12 is also regularly communicating with web server 20 over network access 16 to obtain the updated location information content.

User 24 is a person who uses a computing device to communicate with other users or to interact with information. A computing device includes, but is not limited to, a computer, a cellular phone, a flat screen computer, a notebook, a Chromebook, a smart watch, a tablet computer, vehicle dashboard, monitor, vehicle entertainment system, or a laptop.

User's computing device can be configured to function as a networking device 12. As such, user's computing device is assigned with a SID 12'.

User 24 is recognized by user ID (UID 24') which is associated with the computing device that user 24 possesses at the time when near a networking device 12. UID 24' would be the same as SID 12' when the user's computing device acts as a networking device 12.

UID 24' may be in one of the following form, but is not limited to: a medium access control (MAC) address; an Internet Protocol (IP) address, such as 172.16.254.1 (IPv4), and 2001:db8:0:1234:0:567:8:1 (IPv6); Bluetooth device identifier; ZigBee network device identifier; and IrDA device ID.

A media access control address (MAC address), also called physical address, is a unique identifier assigned to network interfaces for communications on the physical network segment.

Bluetooth device identifier is a unique 48-bit address and usually be presented in the form of a 12-digit hexadecimal value.

ZigBee network device identifier is 4 digit hex number that the device gets while pairing with other similar device.

SID 12' and UID 24' are used for communication between people-to-people and people-to-content. Such that, no personal private data is ever required.

For example, a user 24 wishes to send an e-mail to a friend on facebook, the user 24 is simply to request an e-mail service from the networking device 12 over a user access 22 then types the friend's Facebook e-mail NAME@FACEBOOK.COM as recipient followed by intended message. Once completed, the networking device 12 appends the user's temporary e-mail address made up of a local part UID.SID, an @ symbol, then a case-insensitive domain part, such as UID.SID@NAME.DOMAIN, before forwarding it to the web server 20 over a network access for delivery. The prominent domains are com, info, net, edu, and org, and the country code top-level domains (ccTLDs). Once the user 24 departs or disconnects from the networking device 12, the temporary e-mail becomes inactive. User does not require a login to either facebook or to own e-mail account.

Internet 18 is the global system of interconnected computer networks that use the Internet protocol suite (TCP/IP) to link billions of devices worldwide. It is a network of networks that consists of millions of private, public, academic, business, and government networks of local to global scope, linked by a broad array of electronic, wireless, and optical networking technologies. The Internet carries an extensive range of information resources and services, such as the inter-linked hypertext documents and applications of the World Wide Web (WWW), electronic mail, telephony, and peer-to-peer networks for file sharing.

A network access 16 is a communication interface provided by an internet service provider between a networking device 12 and a web server 20 over Internet 18. The communication interface includes, but is not limited to, fiber optics cable network like Verizon's FiOS, Cellular such as GSM, GPRS, CDMA, LTE, cable TV network, digital subscriber line xDSL, satellite, free space optics (FSO), etc., Internet 18 described above includes both the cloud communications network and non-cloud communications network, in which it includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

Web server 20 is an information technology that processes requests via HTTP, the basic network protocol used to distribute information on the World Wide Web. The term can refer either to the entire computer system, an appliance, or specifically to the software that accepts and supervises the HTTP requests.

Web server 20 contains a e-mail server and database system, such as MySQL, SQL server, Access, oracle, Sybase, DB2, to store the location information content for all deployed networking device 12 at various locations. The database is using structured query language (SQL), a special-purpose programming language, to manage data held in a relational database management system (RDBMS), or for stream processing in a relational data stream management system (RDSMS).

In one embodiment of the invention, web server 20 contains e-mail server and database system containing all location correlated content 14. The content 14 can also be accessible through a graphic user interface such as a HTML representation of a map displaying all available networking devices 12 geographically. User 24 at any location can browse in to the web server 20 via HTTP and subsequently to view and subscribe the content from any networking device 12.

HTTP, Hypertext Transfer Protocol, is an application protocol for distributed, collaborative, hypermedia information systems. HTTP is the foundation of data communication for the World Wide Web (WWW). Hypertext is structured text that uses logical links (hyperlinks) between nodes containing text. HTTP is the protocol to exchange or transfer hypertext. The standards development of HTTP was coordinated by the Internet Engineering Task Force (IETF) and the World Wide Web Consortium (W3C), culminating in the publication of a series of Requests for Comments (RFCs). The first definition of HTTP/1.1, the version of HTTP in common use, occurred in RFC 2068 in 1997, although this was obsolete by RFC 2616 in 1999.

User access 22 is a communication interface between user 24 and networking device 12. The user access 22 includes, but is not limited to, IEEE 802.11x based wireless local area network (WLAN), IEEE 802.15 based Bluetooth, IEEE 802.15.4 based ZigBee, or the Infrared Data Association (IrDA).

User 24 receives location correlated content 14 from nearby networking device 12 via, but is not limited to, text messaging and web browser.

Text messaging, or texting, is the act of composing and sending electronic messages between two or more computing devices, or fixed or portable devices over a phone network. The term originally referred to messages sent using the Short Message Service (SMS). It has grown to include multimedia messages (known as MMS) containing images, voice, videos, and sound content.

Web browser is linked by universal resource locator (URL). URL is a reference to a resource that specifies the location of the resource on a computer network and a mechanism for retrieving it. URLs occur most commonly to reference web pages (http), but are also used for file transfer (ftp), email (mailto), database access (JDBC), and many other applications.

Most web browsers display the URL of a web page in an address bar. A typical URL has the form http://www.example.com/index.html, which indicates the protocol type (http), the domain name, (www.example.com), and the specific web page (index.html).

Figure 2:
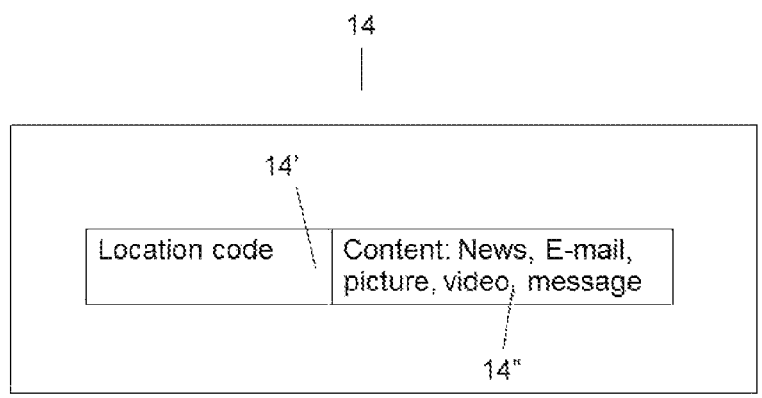
FIG. 2 is a block diagram illustrating an exemplary location content structure.

FIG. 2 is a block diagram illustrating an exemplary location correlated content structure. Location correlated content 14 is location specific and it is recognized by a specific location code, such as ZIP+4 used by United States Postal Service (USPS). However, the present invention is not limited to this embodiment and the location correlated content 14 can also be characterized by any code of string, character, and/or combination thereof.

Location correlated content 14 comprises two parts: location code 14' and the content 14". Content is collected at the web server 18 and is given specific location code, which has a correlation with specific networking device 12. The correlation between the content 14 and the networking device 12 is one-to-one relationship.

All the contents are assigned and sorted based on location code 14' at the web server 20. Web server 20 internally builds a content distribution table links between the content 14 and specific networking devices 12.

The content distribution table maintains a relationship between the content location code 14' and networking device's SID 12' and IP address.

Web server 20 regularly or on demand delivers the content 14 to networking devices 12 according to the IP address from the content distribution table.

Figure 3:
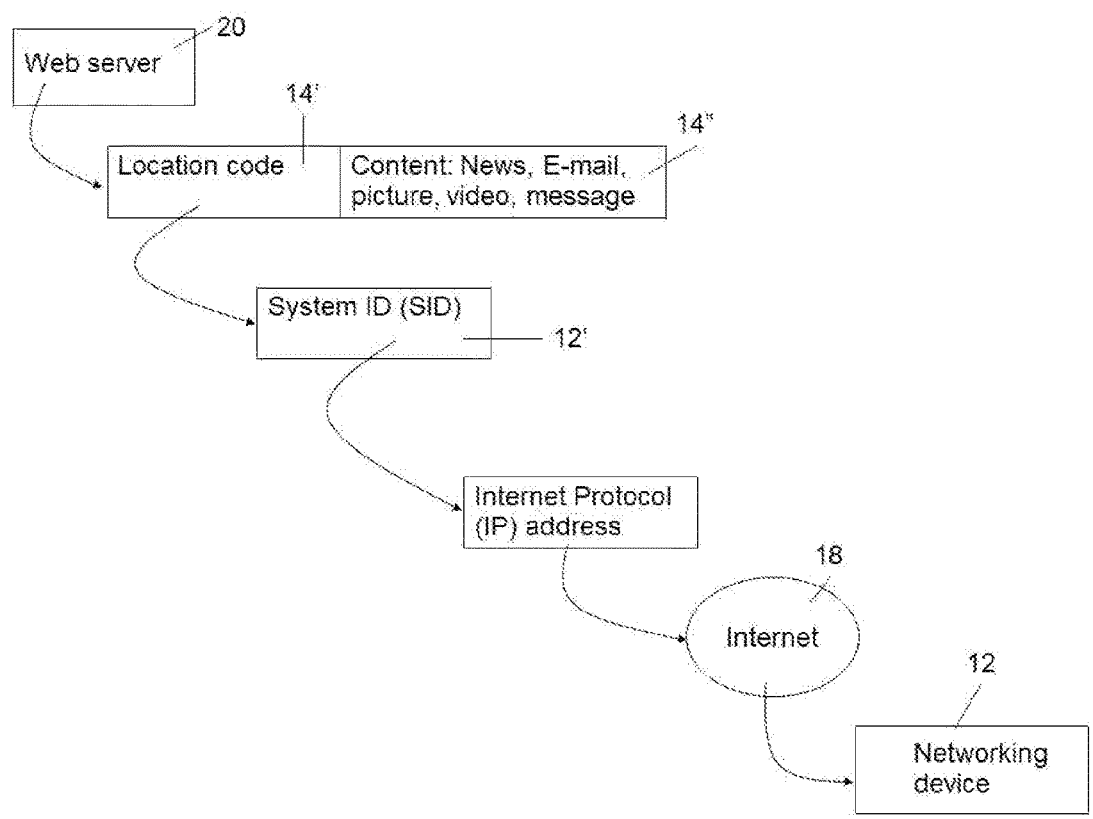
FIG. 3 is a block diagram illustrating an exemplary content distribution.

FIG. 3 is a block diagram illustrating an exemplary content distribution. Web server 20 collects location content 14 and stored them in database. Web server 20 internally builds a look up table between location code 14' and SID 12'.

Web server 20 assigns networking device 12 with SID 12' and IP address. Therefore, once the corresponding SID 12' is found the content is routed and delivered to the corresponding networking device 12 using its IP address over Internet 18.

Figure 4:
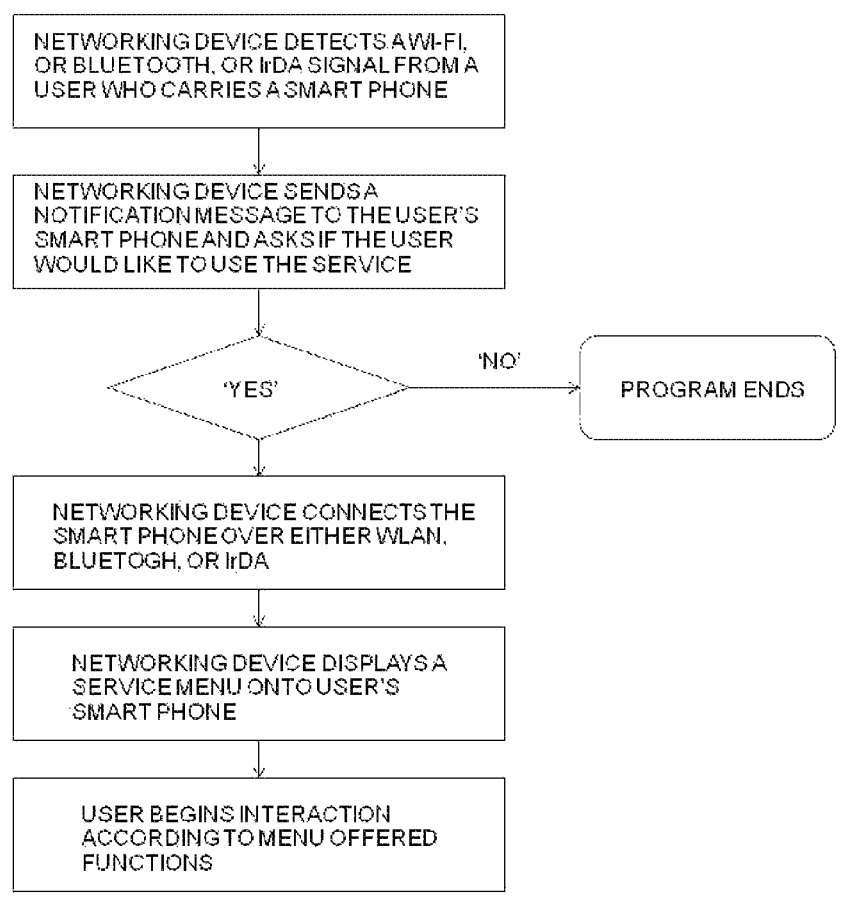
FIG. 4 is an example of a user with smart phone to interact with a networking device.

FIG. 4 is an example of a user with a smart phone to interact with a networking device. Networking device 12 located within an autonomous social media system scans reachable wireless signal emitted from user's smart phone over the user access 22. The wireless signal scanned could be one of the following: IEEE 802.11x based wireless local area network (WLAN), IEEE 802.15 based Bluetooth, IEEE 802.15.4 based ZigBee, or the Infrared Data Association (IrDA).

Once a wireless signal is detected from the user's smart phone, the networking device 12 reads the device ID, such as MAC address, from user's smart phone. The device ID is then recognized by networking device 12 as UID 24'. The process of reading the device ID from user's smartphone is automatic without user's intervention. Networking device 12 then uses SID 12' and UID 24' to send a message to inform the user 24 that location correlated content 14 is available upon acknowledgement.

A positive response permits the networking device 12 to download a web page which contains a service menu with available services to the smart phone. User then is able to use the service according to the menu instruction. The web page (or webpage) is a web document that is suitable for the World Wide Web and the web browser. Smart phone's web browser displays the web page on phone screen. The web page is what displays, but the term also refers to a computer file, usually written in HTML or comparable markup and scripting language.

HTML (Hyper Text Markup Language) is the standard markup language used to create web pages. Along with CSS, and JavaScript, HTML is a cornerstone technology, used by most websites to create visually engaging web pages, user interfaces for web applications, and user interfaces for many mobile applications. Web browsers can read HTML files and render them into visible or audible web pages. HTML describes the structure of a website semantically along with cues for presentation, making it a markup language, rather than a programming language.

Figure 5:
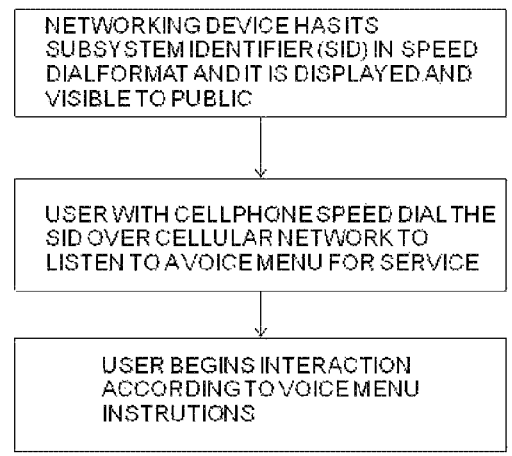
FIG. 5 is an example of a user with a cell phone to interact with a networking device.

FIG. 5 is an example of a user 24 with a cell phone to interact with networking device 12. Every networking device 12 has a unique SID 12' which is assigned by web server 20. SID 12' can be represented as a speed dial number which user 24 can quickly dial into a networking device 12 for receiving location correlated content. SID 12' could be written and displayed in cell phone speed dial notation, such as, but is not limited to: #1234 or *555.

Once the user 24 dials SID 12' the corresponding networking device 12 replies with a voice menu for available services. User 24 interacts with the voice menu according to voice instruction. For example, "press 1 for schedule"; "press 2 for local weather"; "press 0 for speak to operator"; and, etc., In this embodiment, users can dial into any networking device 12 over a phone system which supports speedy dial so long as the SID 12' is known.

Figure 6:
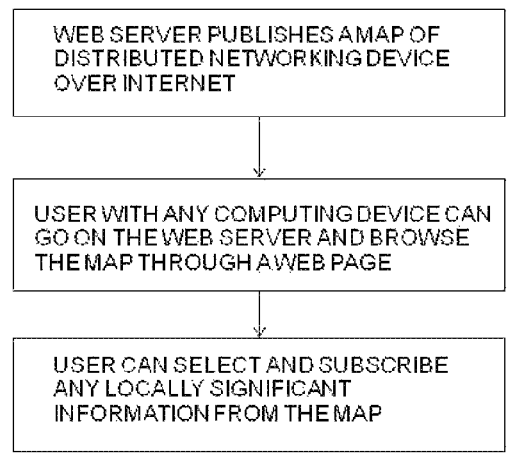
FIG. 6 is an example of a user to interact with a networking device over Internet.

FIG. 6 is an example of user 24 to interact with a networking device 12 over Internet. Web server 20 contains a database system, such as MySQL, SQL server, Access, oracle, Sybase, DB2, to store the location information content for all deployed networking device 12 at various locations. The deployed networking devices 12 can be organized and displayed as graphical representation such as a topology map showing all 12 are physically located. User 24 with an Internet capable device can log on web server 20 World Wide Web (WWW) address to browse the map.

User 24 can click on particular networking device 12 from the map to browse its published content 14 which has local significance to that particular location.

In one embodiment, user 24 can subscribe/un-subscribe the content 14 from the topology map by providing either her (his) cell phone number or e-mail address.

Figure 7:
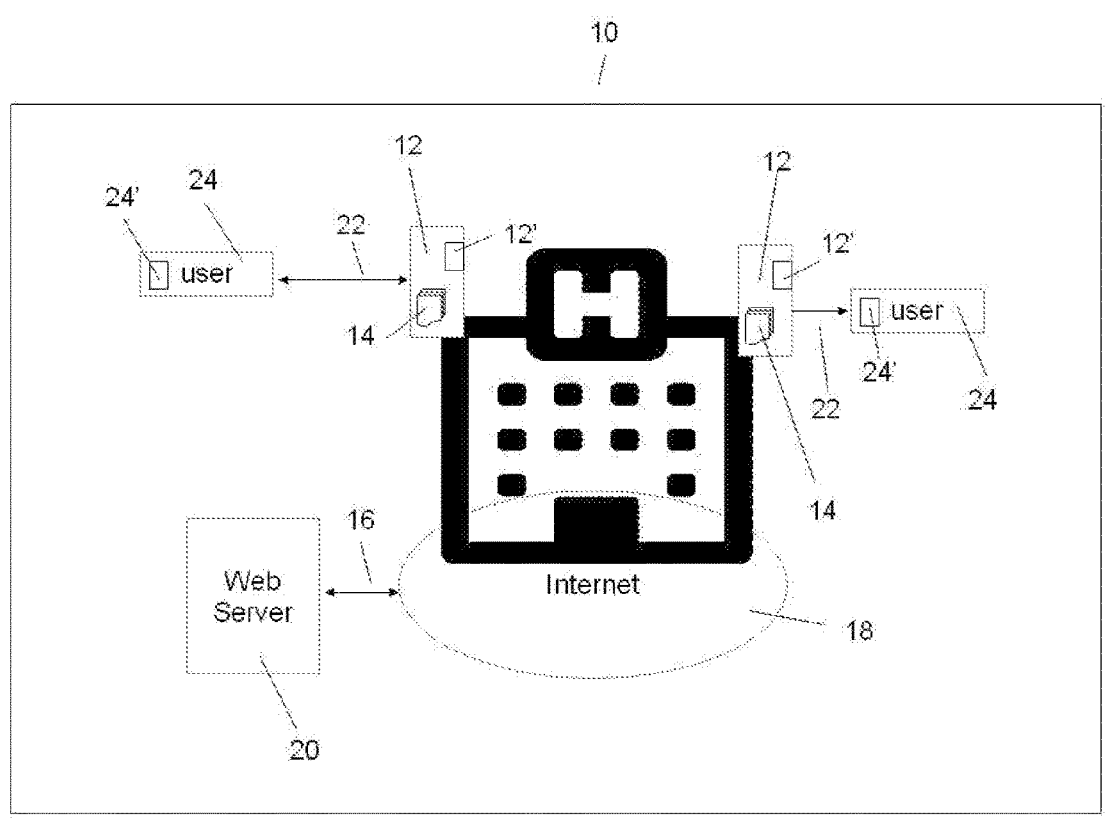
FIG. 7 is an autonomous social media system deploy at a hospital.

FIG. 7 is an example of autonomous social media system for a hospital. People inside or near a hospital are interested in receiving medical related information content 14. One or more networking device 12 are deployed and installed at various areas inside the hospital. For example, a networking device 12 at hospital registration area would provide patients with appointment scheduling service, hospital news announcement, local weather update, local traffic and road condition, and other news. Depending on the context of the information, networking devices 12 can be deployed accordingly at appropriate locations. Such that, people could receive the information that is concerning them most.

The information content 14 is sorted and organized at web server 20 by specific location code 14'.

People or user 24 who has computing and communication device, such as computer, smart phone, cell phone, tablet, can interface with the networking device 12 via SID 12' and UID 24'.

Figure 8:
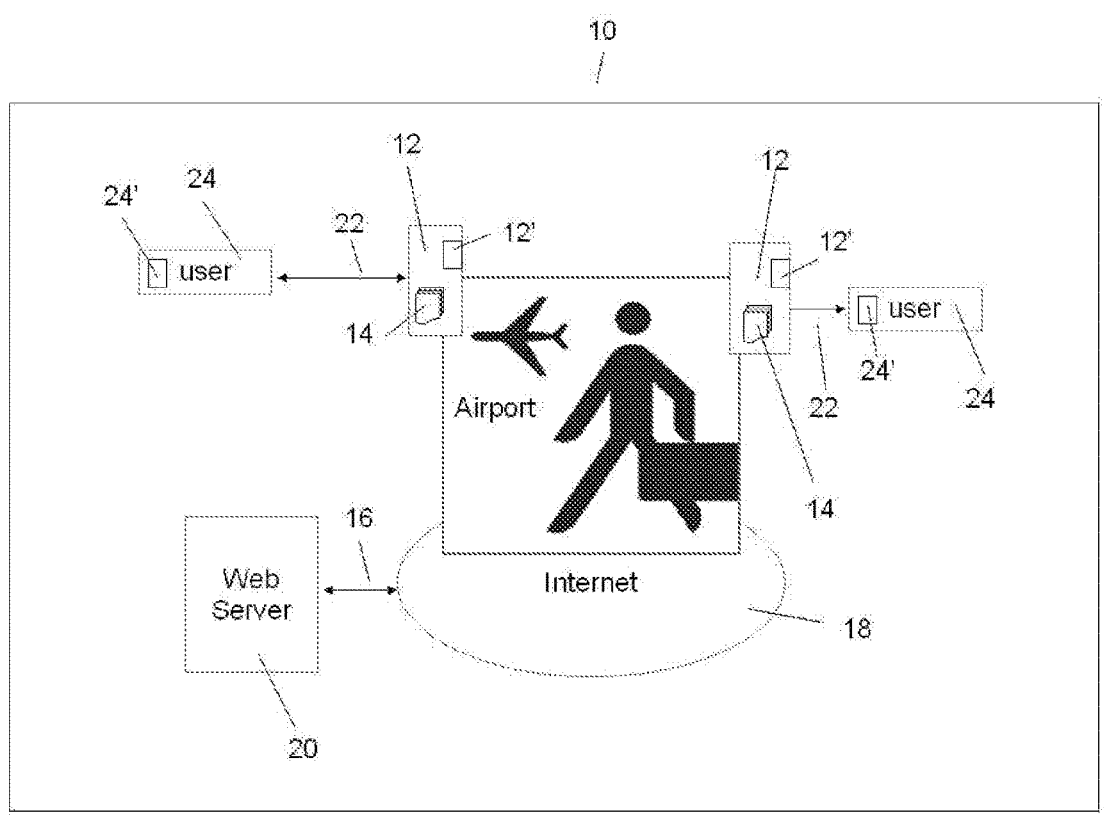
FIG. 8 is an example of an autonomous social media system deploying at an airport.

FIG. 8 is an example of autonomous social media system at an airport. People (user 24) inside or near an airport are interested in receiving travel related information. Networking device(s) 12 are deployed and installed at various areas inside the airport. For example, a networking device 12 at gate area could provide travelers with flight schedule update, airport news announcement, local weather update, lost and found, and other events. Depending on the context of the information, networking devices can be deployed accordingly at appropriate locations. Such that, people could receive the information that is concerning them most.

The information content 14 is sorted and organized at web server 20 by specific location code 14'. The content 14 is then distributed to networking device(s) 12 at places where the content 14 is mostly concerning to people in that area.

Travelers or user 24 who has computing and communication device, such as a computer, a smart phone, a cell phone, or a tablet, can interface with the networking device 12 via SID 12' and UID 24'.

Figure 9:
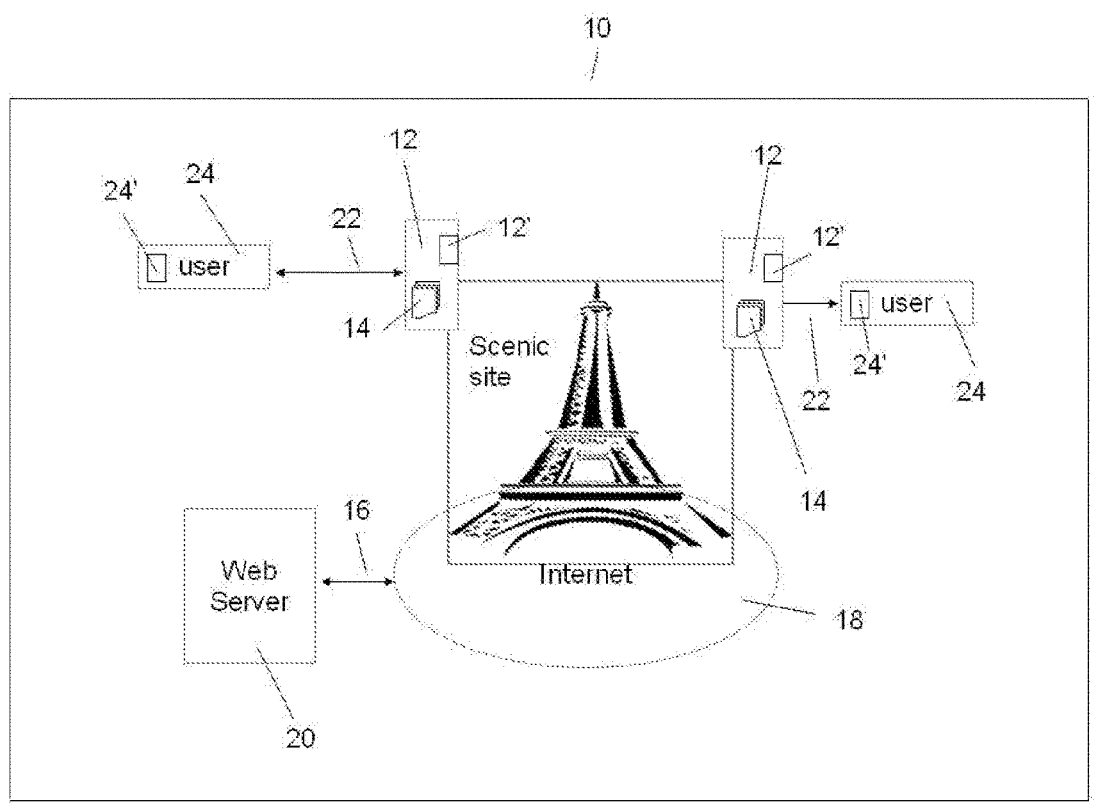
FIG. 9 is an example of an autonomous social media system at a tourist scenic site.

FIG. 9 is an example of autonomous social media system deploying at a tourist scenic site. Tourist (user 24) inside or near a scenic spot are interested in receiving scenic related information. Networking device(s) 12 are deployed and installed at various areas inside the scenic site. For example, a networking device 12 may provide travelers with following contents 14, but is not limited to, historic introduction, ticketing and pricing information, promotional event, local weather update, and lost and found, hotel information, nearby shops, street maps, and other events.

At the scenic site, tourist may post pictures or video clips to their friends. For example, a user 24 wants to send a picture from digital camera to friends, the user 20 simply requests a file forwarding service from the networking device 12. The file forwarding service first verifies whether the digital camera equips with a user access 22, such as Wi-Fi, Bluetooth, ZigBee, or IrDA. Once a user access 22 is confirmed, the networking device 12 establishes a connection to the camera then asks the user 24 for the contact information of the recipients before fetching the file from the camera for delivery. The contact information of the recipient could be, but is not limited to, cell phone number or e-mail address.

Figure 10:
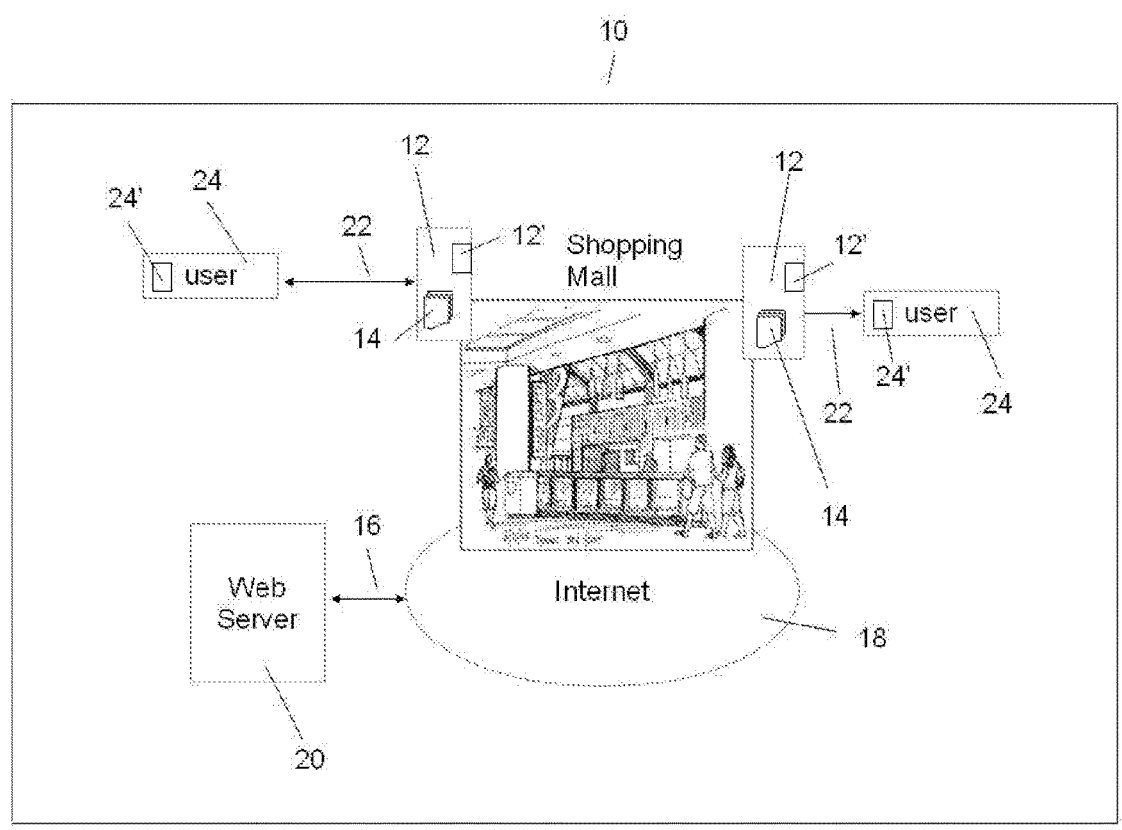
FIG. 10 is an example of an autonomous social media system deploying at shopping mall.

FIG. 10 is an example of autonomous social media system deploying at a public shopping mall. People inside or near a shopping mall are interested in receiving commercial product related information. Networking device(s) 12 are deployed and installed at various areas inside a shopping mall. For example, a networking device 12 may provide shoppers (user 24) with following, but is not limited to: mall directory, special promotional event, parking locator, local weather update, lost and found, search on specific products or shops, message board, and other events.

At shopping mall, shoppers are interested in shopping related events. For example, a user 20 is interested in purchasing a pair of shoes; the user 24 simply uses a computing device, such as a smart phone, a tablet, a computer, to request a search and comparison service from the networking device 12. The service first search available shoes by brands, names, and size from available shops, then compare prices before forwarding the search result to shopper's computing device.

Figure 11:
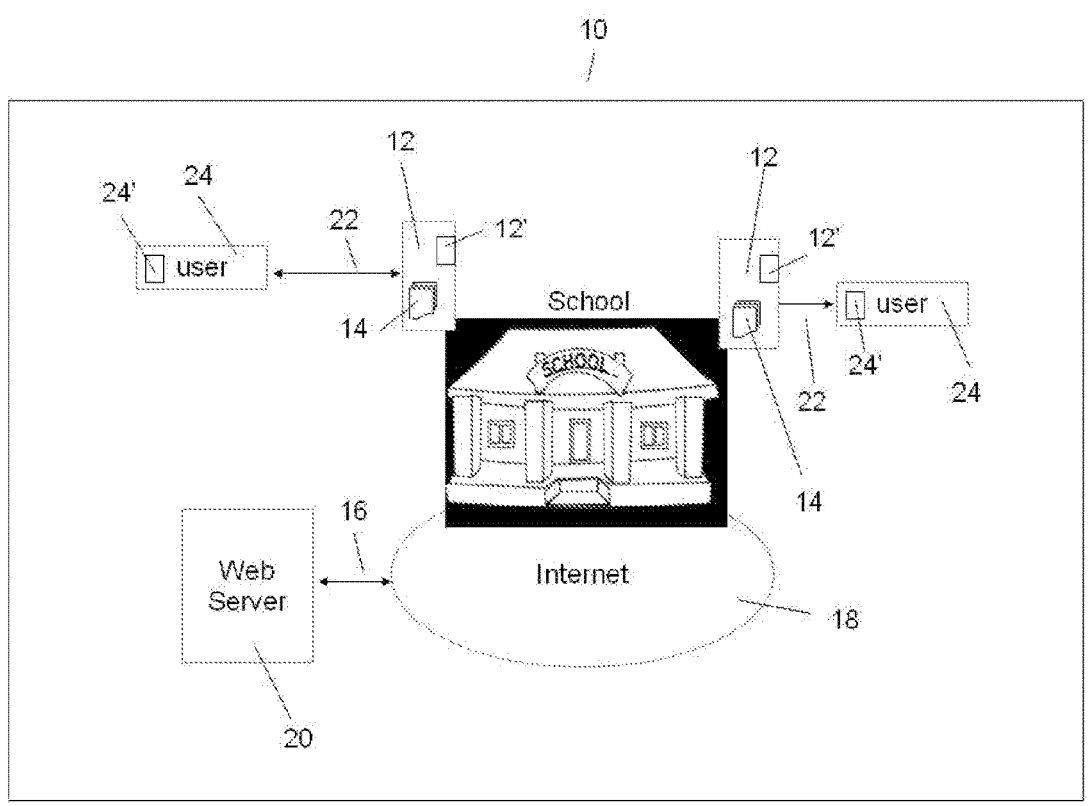
FIG. 11 is an example of an autonomous social media system deploying at a school.

FIG. 11 is an example of autonomous social media system deploying at a school. In this embodiment, people inside a school receive education related information which is school correlated content 14. Networking device(s) 12 are deployed and installed at various areas inside a school. For example, a networking device 12 may provide user 24 with following contents over user access 22, but is not limited to: school directory, class schedule and class rooms, lecture handout, teaching material, school calendar, test schedule, tutoring service, school bus schedule, sports event, student clubs and events, etc., When networking device 12 is located at classrooms it receives teaching material related content 14 to that classroom from web server 20. Different teaching material can be sent to different classrooms according to class schedules. Students (user 20) equip with computers are able to receive lecture notes, homework assignment, test from the networking device 12 over the user access 22. Students (user 24) equip with computers are also able to upload homework assignment or test sheet to their teacher over networking device 12.

Figure 12:
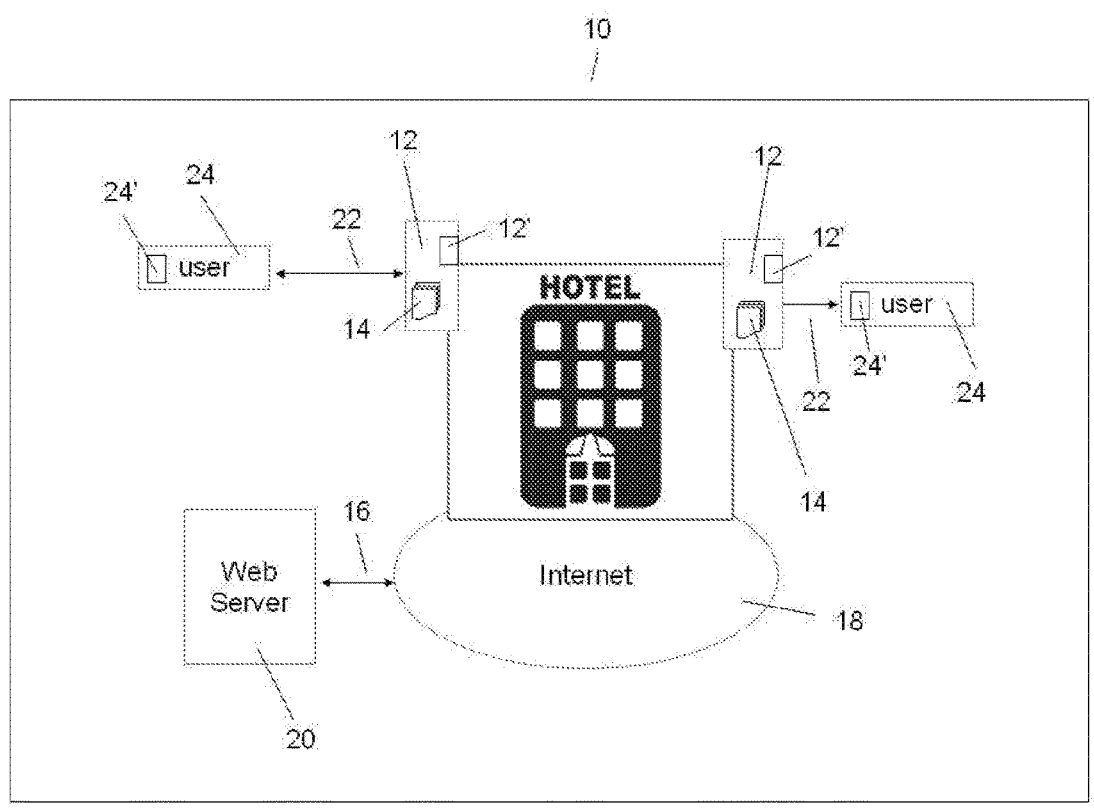
FIG. 12 is an example of an autonomous social media system deploying at a hotel.

FIG. 12 is an example of autonomous social media system deploying at a hotel. People (user 24) inside or near a hotel can receive travel and accommodation related information. For example, a networking device 12 may provide people (user 24) with following contents over user access 22 at the hotel, but is not limited to: hotel directory, restaurant and bar location and business schedule, airport shuttle schedule, airlines arrival/departure schedule, conference events and schedules, concierge service, hotel promotion, and other events, etc., The embodiment of the presentation invention is location-centric social media. However, it does not preclude user(s) 24 from conducting activities that are performed on other user-centric social media, such as Facebook, Google+, You Tube, Twitter, etc. The activity includes, but is not limited to: posting and receiving e-mail, message, video, blog.

FIG. 13 is an example of a transport protocol data unit (TPDU) when conducting social media convention over autonomous social media system. TPDU is used to deliver user's data as a unit among peer entities of a network and that contains control information, such as address information and user data.

TPDU comprises six elements: Header (H), web server IP address, SID 12', UID 24', recipient ID, and user data. H is header of the TPDU, which is an indicator of privacy type (for example: private vs. public); web server IP address is a routable IP address; SID 12' is networking device identifier; UID 24' is user device identifier; recipient ID is the destination identifier; and user data is the data payload that contains user specific data.

Instead of using personal e-mail address, user(s) 24 communicate with each other via SID 12' and UID 24'. No user account registration or personal information is ever required. SID 12' and UID 24' are autonomous and depend only on user's current association with a networking device 12 and possess device.

E-mail: Electronic mail or e-mail is a method of exchanging digital messages from an author to one or more recipients. User(s) 24 send and receive e-mail through the networking device 12 across the Internet or other computer networks via an email server facility within the web server 20. E-mail user only needs to specific the privacy and recipient's e-mail address; the networking device 12 appends web server IP address, SID 12', and UID 24' automatically before forwarding it to the web server 20 for delivery. E-mail is a user data which is encapsulated in the TPDU.

Once receives the TPDU that is forwarded from networking device 12, web server 20 is then transports the e-mail part according to the recipient's ID over e-mail protocols such as IMAP (Internet Message Access Protocol), POP (Post Office Protocol 3), or SMTP (Simple Mail Transfer Protocol).

IMAP (Internet Message Access Protocol)—Is a standard protocol for accessing e-mail from local mail server. IMAP is a client/server protocol in which e-mail is received and held by Internet server. As this requires only a small data transfer this works well even over a slow connection such as a modem. Only if upon a request to read a specific email message will it be downloaded from the server.

The POP (Post Office Protocol 3) protocol provides a simple, standardized way for users to access mailboxes and download messages to their computers. When using the POP protocol all e-mail messages will be downloaded from the mail server to user's local computing device.

The SMTP (Simple Mail Transfer Protocol) protocol is used by the Mail Transfer Agent (MTA) to deliver e-mail to the recipient's mail server. The SMTP protocol can only be used to send emails, not to receive them.

Posting message, picture, and video: User 24 who wishes to send messages only needs to specify privacy type and recipient's identifier, such as e-mail address and twitter's user name, for messaging. The message is formulated in TPDU at the networking device 22. Once receives the TPDU that is forwarded from networking device 12, web server 20 is then transports the message to recipient according to the receiving service platform is used.

Posting public message: any user 24 can send/receive public message to/from all networking device(s) 12 via TPDU. A privacy type header (H) is set to public when sending public message.

Figure 14:
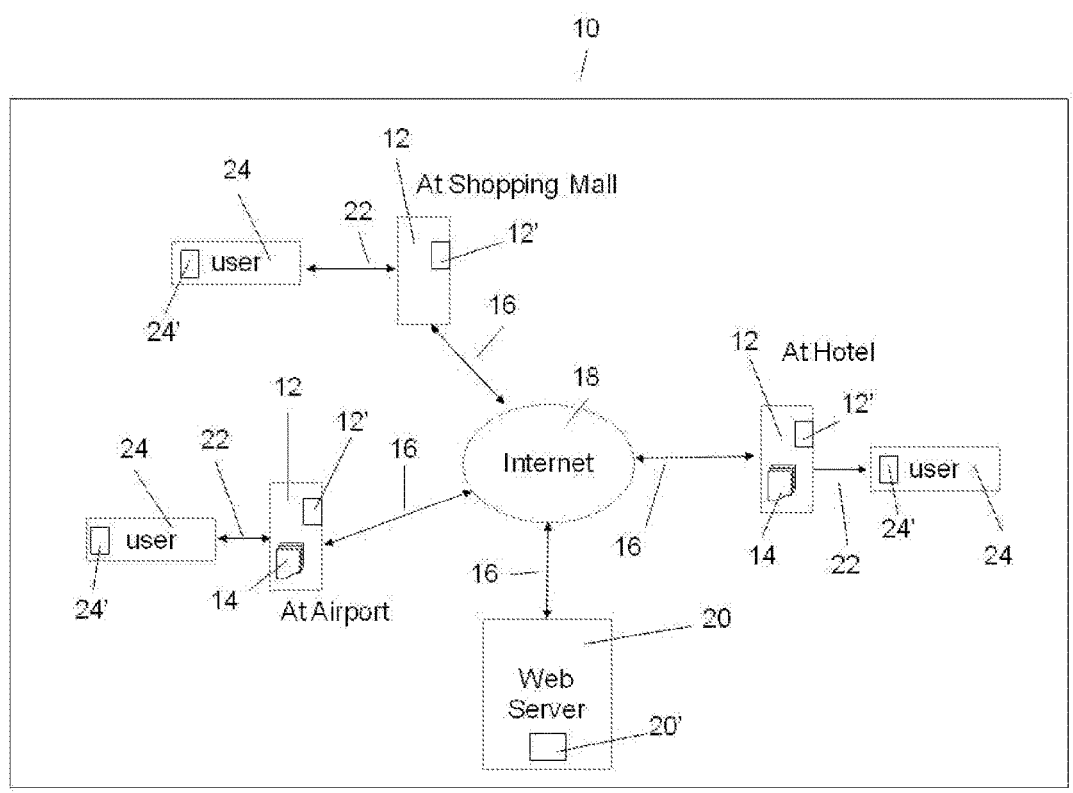
FIG. 14 is an example of posing advertisement to targeted users on autonomous social media system.

FIG. 14 is an example of posing advertisement to targeted users on autonomous social media system. In one embodiment of the invention, users are located at or near a particular networking device 12 which makes them a targeted group for interacting with commercial advertisements 20'. Commercial advertisement on specific product is targeted to user(s) 24 closely to the location of the networking device 12.

For example, travel related products can be advertised to networking devices 12 that are located at airport. Web server 20 manages the distribution of the advertisement 20'. In this embodiment, there is no limit on the advertising content to where networking device 12 is located.

Figure 15:
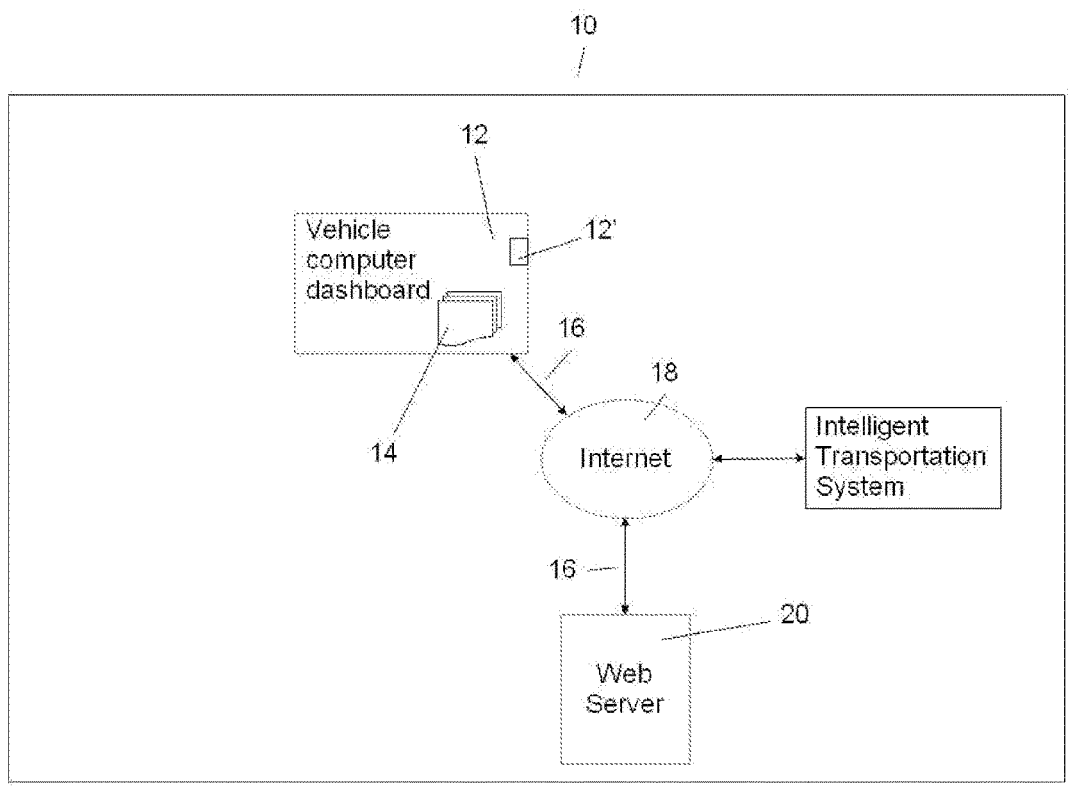
FIG. 15 is an example of applying autonomous social media system to interact with intelligent transportation systems (ITS).

FIG. 15 is an example of applying autonomous social media system to interact with intelligent transportation systems (ITS). ITS may refer to all modes of transport, EU Directive 2010/40/EU (7 Jul. 2010) defines as an advanced system in which information and communication technologies are applied in the field of road transport, including infrastructure, vehicles and users, and in traffic management and mobility management, as well as for interfaces with other modes of transport.

Web server 20 collects traffic and road conditions from ITS data center through network access 16 over Internet 18. The collected data point is sorted with location reference and links to SID 12' at web server 20 before distributing them to corresponding networking device 12.

In this embodiment, a driver is driving a vehicle on the road and her (his) computing device is a vehicle computer dashboard. Computer dashboard is a networking device 12 which equips with GPS receiver and network access 16 over Internet 18 to communication networks, such as cellular network. A display on the dashboard that presents constantly updated information. The dashboard is assigned with IP address and SID 12' by the web server 20. The dashboard regularly reports vehicle's location via GPS to web server 20 in order to receive updated location correlated content 14.

Having thus described the invention, what is desired to be protected by Letters Patent is presented in the subsequently appended claims.

What is claimed is:

1. An autonomous private location correlated content system, comprising in combination:
    a plurality of networking devices, each with a central processing unit and a unique system identifier (SID) assigned by a web server and with a user identifier (UID) obtained on the plurality of network devices, for accessing, sending, receiving and distributing autonomous private location correlated content,
    wherein the SID comprises an Internet Protocol (IP) address assigned by the web server, Global Positioning System (GPS) information, Zone Improvement Plan (ZIP) code and extended ZIP+4 code both used by United States Postal Service (USPS), wherein the SID protects the privacy and identity of the plurality of networking devices while allowing autonomous private location correlated content to be accessed, sent and received,
    wherein the UID comprises a Media Access Control (MAC) address, an Internet Protocol (IP) address and a wireless device identifier for the plurality of networking devices,
    wherein a combination of the UID and the SID (UID.SID) provides a temporary private network address for a networking device on a communications network for accessing, sending and receiving autonomous private location correlated content at a desired location;
    the web server, for assigning a unique SID and an IP address to each of the plurality of networking devices and for managing and distributing the autonomous private location correlated content to the plurality of networking devices with the assigned SIDs and IP addresses, thereby providing private communications and protecting a privacy and an identity of the plurality of networking devices;
    the communications network, for providing communications between the plurality of networking devices and the web server;
    a wireless user access component on the plurality of networking devices, for accessing, sending and receiving the autonomous private location correlated content; and
    the autonomous private location correlated content, provided to the plurality of networking devices physically at or near a desired location, the autonomous private location correlated content comprising: a transport protocol data unit (TPDU) including: a header field H, web server IP address, SID, UID, recipient ID including a destination identifier, and user data, wherein the header field H includes an indicator of a privacy type including public or private communications for the plurality of networking devices.

2. The system of claim 1 wherein the autonomous private location correlated content includes targeted marketing information for a group of networking devices physically at or near the desired location.

3. The system of claim 1 wherein the autonomous private location correlated content includes local information for a group of networking devices physically at or near the desired location including news, weather forecasts, emergency alerts, sports, schedules, directions, lost and found and directory information.

4. The system of claim 1 wherein the wireless user access component includes an IEEE 802.11x, IEEE 802.15-Bluetooth, IEEE 802.15.4-ZigBee, or the Infrared Data Association (IrDA) wireless user access components.

5. The system of claim 1 wherein the web server includes an associated database with a structured query language (SQL) to manage data held in a relational database management system (RDBMS), or to manage data for stream processing in a relational data stream management system (RDSMS).

6. The system of claim 1 wherein the networking device includes a computer, a cellular phone, notebook computer, laptop computer, tablet computer, smart watch, vehicle dashboard monitor or vehicle entertainment system.

7. The system of claim 1 wherein the autonomous private location correlated content location content includes information for a hospital, school, shopping mall, tourist site, hotel, blog, advertising, social media system or intelligent transportation system (ITS).

8. The system of claim 1 wherein autonomous private location correlated content includes information sent to a social media platform without requiring account registration or account login on the social media platform.

9. A method for providing autonomous private location correlated content, comprising:
    obtaining a user identifier (UID) on a networking device with a central processing unit, the UID comprising an Media Access Control (MAC) address, Internet Protocol (IP) address and a unique wireless device identifier;

sending a request including the UID from the networking device to a web server via a communications network to receive autonomous private location correlated content;

receiving a response on the networking device from the web server via the communications network including an a unique system identifier (SID) assigned to the networking device on the communications network, the SID comprising: (1) an Internet Protocol (IP) address assigned to the networking device by the web server, (2) Global Positioning System (GPS) information, and (3) a Zone Improvement Plan (ZIP) code used by the United States Postal Service (USPS) and (4) an extended ZIP+4 code used by USPS, a combination of the SID and the UID (UID.SID) providing a temporary private network address on the communications network uniquely identifying the networking device and protecting the privacy and the identity of the networking device while sending and receiving the autonomous private location correlated content on the communications network; and receiving on the networking device at the temporary private network address UID.SID from the web server via the communications network, autonomous private location correlated content including private and public messages when the networking device is physically at or near a desired physical location, the autonomous private location correlated content comprising one or more transport protocol data units (TPDU) including: a header field H, web server IP address, SID, UID, recipient ID including a destination identifier, and user data, wherein the header field H includes an indicator of a privacy type including public or private communications accepted on the networking device.

10. The method of claim 9 wherein the autonomous private location correlated content includes information for a hospital, school, shopping mall, tourist site, hotel, blog, advertising, social media system or intelligent transportation system (ITS).

11. The method of claim 9 wherein the autonomous private location correlated content includes private and public e-mail, text, voice, video, broadcasting or social media information.

12. The method of claim 9 wherein the networking device includes a computer, a cellular phone, notebook computer, a laptop computer, tablet computer, smart watch, vehicle dashboard monitor or vehicle entertainment system.

13. The method of claim 9 further comprising:

determining from the networking device via the web server and the communications network that a second networking device with a central processing unit and a second user identifier (UID2) is physically at or near the desired physical location, wherein the second networking device has been assigned a unique second SID (SID2) by the web server and receives autonomous private location correlated content;

sending a private message as autonomous private location correlated content from the networking device at the temporary private network address UID.SID to a second networking device at a second private temporary network address UID2.SID2 via the web server and the communications network, wherein the private message is sent in one or more transport protocol data units (TPDU), thereby protecting the privacy and the identity of the networking device and second networking device while sending and receiving private messages associated with the autonomous private location correlated content.

14. The method of claim 13 further comprising:

receiving a second private message as autonomous private location correlated content on the networking device at the temporary private network address UID.SID from the second networking device at the temporary private network address UID2.SID2 via the web server and communications network, wherein the private second message is received in one or more transport protocol data units (TPDU), thereby protecting the privacy and the identity of the networking device and second networking device while sending and receiving private messages associated with the autonomous private location correlated content.

15. The method of claim 9 further comprising:

determining from the networking device via the web server and the communications network that a plurality of other networking devices each with a central processing unit and UID2 to UIDX, wherein X is positive number greater than 2, are physically at or near the desired physical location, wherein the plurality of other networking device each been assigned a unique other SID2 to SIDX by the web server and receives autonomous public location correlated content;

sending a public message as autonomous private location correlated content from the networking device at the temporary private network address UID.SID to the plurality of the networking devices at temporary private network addresses UID2.SID2 to UIDX.SIDX via the web server and the communications network, wherein the public message is sent in one or more transport protocol data units (TPDU);

thereby protecting the privacy and the identity of the networking device and the plurality of other networking devices while sending and receiving public messages associated with the autonomous private location correlated content.

16. The method of claim 15 further comprising:

receiving one or more second public messages as autonomous private location correlated content on the networking device at the temporary private network address UID.SID from the plurality of other networking devices at the temporary network private addresses UID2.SID2 to UDIX.SIDX via the web server and communications network, wherein the one or more second public messages are sent in one or more transport protocol data units (TPDU), thereby protecting the privacy and the identity of the networking device and the plurality of other networking devices while sending and receiving public messages associated with the autonomous private location correlated content.

* * * * *